(12) United States Patent
Braundmeier (10) Patent No.: US 11,042,538 B2
(45) Date of Patent: Jun. 22, 2021

(54) PREDICTING QUERIES USING NEURAL NETWORKS

(71) Applicant: MasterCard International Incorporated, Purchase, NY (US)

(72) Inventor: Aaron Braundmeier, St. Peters, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 150 days.

(21) Appl. No.: 16/112,415

(22) Filed: Aug. 24, 2018

(65) Prior Publication Data

US 2020/0065412 A1 Feb. 27, 2020

(51) Int. Cl.
| | |
|---|---|
| *G06F 17/30* | (2006.01) |
| *G06F 16/242* | (2019.01) |
| *G06N 3/08* | (2006.01) |
| *G06F 16/2455* | (2019.01) |

(52) U.S. Cl.
CPC ...... *G06F 16/2425* (2019.01); *G06F 16/2455* (2019.01); *G06N 3/08* (2013.01)

(58) Field of Classification Search
CPC ............ G06F 16/2425; G06F 16/2455; G06F 16/242; G06N 3/08; G06N 3/04
See application file for complete search history.

(56) References Cited

U.S. PATENT DOCUMENTS

| | | | |
|---|---|---|---|
| 7,552,113 B2 * | 6/2009 | Roe ..................... | G06F 16/9535 |
| 9,740,780 B1 | 8/2017 | Herscovici et al. | |
| 2011/0082848 A1 * | 4/2011 | Goldentouch ...... | G06F 16/9535 |
| | | | 707/706 |
| 2011/0258148 A1 | 10/2011 | Gao et al. | |
| 2014/0026221 A1 * | 1/2014 | B'Far ..................... | G06F 21/50 |
| | | | 726/26 |
| 2014/0207746 A1 | 7/2014 | Song et al. | |
| 2014/0310470 A1 | 10/2014 | Rash et al. | |
| 2016/0063067 A1 * | 3/2016 | Maitra ................. | G06F 16/435 |
| | | | 707/734 |
| 2017/0316334 A1 | 11/2017 | Srivastava et al. | |
| 2018/0107742 A1 | 4/2018 | Kapoor et al. | |
| 2019/0050454 A1 * | 2/2019 | Orad .................. | G06F 16/2455 |
| 2019/0114509 A1 * | 4/2019 | Deng .................... | G06N 3/084 |
| 2019/0391982 A1 * | 12/2019 | Duzhik .................... | G06N 3/04 |

FOREIGN PATENT DOCUMENTS

RU 122689 * 6/2018

OTHER PUBLICATIONS

Byum, Sung Cheal., "International Search Report and Written Opinion of the International Searching Authority", International Application No. PCT/US2019/039686, dated Oct. 18,2019, 10 pages.

* cited by examiner

*Primary Examiner* — Huawen A Peng (57) ABSTRACT

A system for generating queries accesses a query history for a user. The query history includes a plurality of queries having defined query parameters. The query parameters are extracted from the plurality of queries and input into a neural network. The neural network generates an output corresponding to a predicted query the output is used to generate a predicted query and run the predicted query to generate a query result. By running the predicted query prior to a user requesting the query, results are thereby provided without lengthy processing delays when the user requests the predicted query.

20 Claims, 10 Drawing Sheets

```
curl -k -u :7180/api/v19/clusters/dev_cloud_aaron/services/impala/impalaQueries
{
  "queries" : [ {
    "queryId" : "224da5c52f8f4bdd:278671ea00000000",
    "statement" : "drop table degree_value",
    "queryType" : "DDL",
    "queryState" : "RUNNING",
    "startTime" : "2018-03-09T18:08:21.803Z",
    "rowsProduced" : null,
    "attributes" : {
      "admission_result" : "Unknown",
      "session_id" : "b44324191b86bd50:ce0580d86ce3cd97",
      "oom" : "false",
      "planning_wait_time" : "4",
      "state_missing" : "false",
      "ddl_type" : "DROP_TABLE",
      "network_address" : "",
      "file_formats" : "",
      "planning_wait_time_percentage" : "0",
      "client_fetch_wait_time" : "0",
      "client_fetch_wait_time_percentage" : "0",
      "connected_user" : "admin",
      "session_type" : "HIVESERVER2",
      "impala_version" : "impalad version 2.11.0-cdh5.14.0 RELEASE (build d68206561bc78e6cd27aa7690)",
      "stats_corrupt" : "false",
      "query_status" : "OK",
    },
    "user" : "admin",
    "coordinator" : {
      "hostId" : "69b96455-9c99-47cd-a6d4-0edf422e9296"
    },
    "detailsAvailable" : true,
    "database" : "default",
    "durationMillis" : 8901009
```

FIG.7

802 {
SELECT * FROM jan_2018_trans SORT BY amount ;
SELECT * FROM feb_2018_trans SORT BY amount ;
SELECT * FROM jan_2018_trans AND feb_trans_SORT BY date ;
SELECT * FROM mar_2018_trans SORT BY amount ;
SELECT * FROM apr_2018_trans SORT BY amount ;

SELECT * FROM mar_2018_trans AND_apr_2018_trans SORT BY date ;

PREDICTING QUERIES USING NEURAL NETWORKS

BACKGROUND

Queries on large datasets can take significant amounts of time to complete, such as when querying historical transaction data. These queries may be used to provide results that are needed in a timely manner. For example, queries on transaction data within a large dataset can be used for delivering analytical insights, such as to a customer with service-level agreements (SLAs) related to getting the results back in a timely manner.

As the size of the datasets grow, which occurs over time as more data is stored, query times for searching that data increases with conventional search engines. In some instances, the amount of time needed to run a query can become unacceptable or cause a user to run a modified query providing less relevant results, but in a more acceptable time frame. Thus, using conventional search engines, timely and desired results may not be provided.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for generating queries comprises accessing a query history for a user. The query history comprises a plurality of queries having defined query parameters. The computerized method further comprises extracting the query parameters from the plurality of queries and inputting the query parameters into a neural network. The neural network generates an output corresponding to a predicted query. The computerized method also comprises using the output to generate a predicted query and run the predicted query to generate a query result.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein.

Corresponding reference characters indicate corresponding parts throughout the drawings. In the figures, the systems are illustrated as schematic drawings. The drawings may not be to scale.

DETAILED DESCRIPTION

The computing devices and methods described herein are configured to identify query patterns of users that allows for predicting a future search that the user may want to perform. Using a neural network, various examples identify patterns or other characteristics based on a user's search history (e.g., searching patterns or habits) to predict possible future queries for that user, as well as provide suggestions for queries. In some examples, a user's query is predicted based on running historical usage patterns through a neural network.

The computing devices and methods output one or more predicted queries that in some examples are run prior to user initiation of a search, namely, prior to the user requesting the search. The systems and methods thereby save considerable amounts of time, as well as increase the level of automation in the searching platform. As such, search results are provided to a user in a shorter amount of time, thereby improving the user's experience. In this manner, when a processor is programmed to perform the operations described herein, the processor is used in an unconventional way, and allows for more efficient query execution and faster output of results.

Various examples use one or more of several inputs based on a user's historical queries, such as average input volume (e.g., how many files are typically used in the user's query), average query frequency (e.g., how often is the query run), average input range (e.g., do the user's queries typically use one, two or five years of transactional data, or a number of months), and average query structure (e.g., how are the result sorted), to predict future queries. In one example, the variables are processed by a multi-layer (e.g., three-layer) neural network that outputs a query (or multiple queries) that the system identifies as possible or most likely to be the next query or queries the user will run. In various examples, the system runs the query before a user requests that query (i.e., automatically, without user interaction). For example, new data files upon which the user performs searches are loaded into the system, such as on a daily or weekly basis (e.g., in the overnight hours). The present disclosure configures a neural network system to, in some examples, run the predicted query (or queries) once the new files and data are detected and saved.

Figure 1:
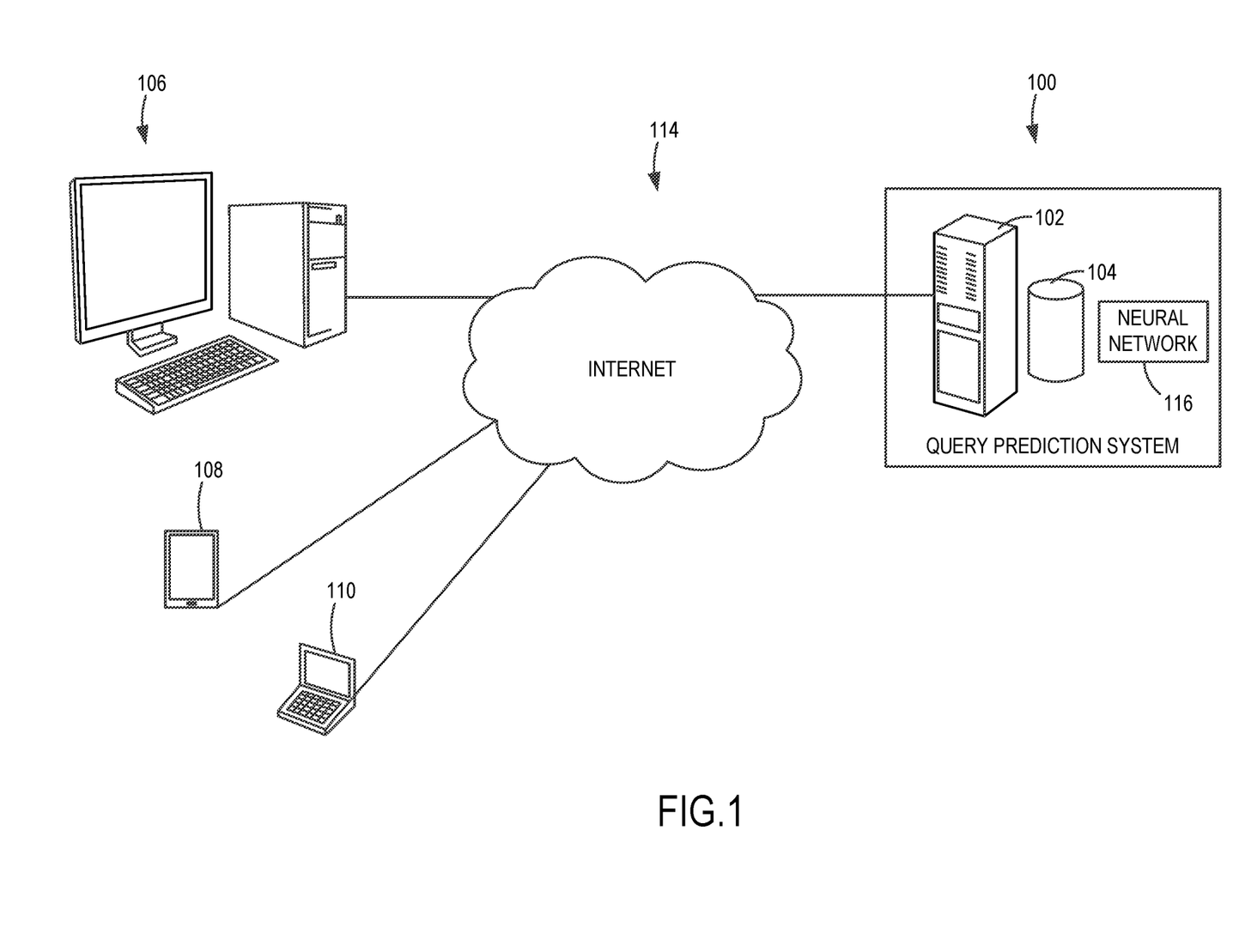
FIG. 1 is an exemplary block diagram illustrating a query prediction system according to an embodiment.

FIG. 1 is a schematic block diagram of a query prediction system 100 deployed as a cloud service in this example. The query prediction system 100 includes one or more computers 102 and storage 104 to store neural models in some examples, such as predictive query trained neural models that are user specific. The query prediction system 100 is connected to one or more end user computing devices, such as a desktop computer 106, a smart phone 108 and a laptop computer 110. For example, the query prediction system 100 is shown as connected to the end user computing devices via a computer network 114, illustrated as the Internet.

In one embodiment, the query prediction system 100 receives historical user query data, wherein the queries are generated from one or more end user computing devices. For example, a list of queries performed by a specific user (such as over a defined time period) that are stored in the end user computing device are communicated to the query prediction system 100. In one example, the historical user query data is transmitted at defined intervals (e.g., daily, weekly, etc.). In another example, when a query operation is performed, the query command is stored in the storage 104. In another example, the historical user query data is stored in both the end user computing device and in the storage 104.

The query prediction system 100 uses a neural network 116 according to the present disclosure to predict a user's query. For example, historical query data, such as historical usage patterns for the user, is processed using the neural network 116. In one example, given a large dataset, wherein ad hoc queries are often performed, the present disclosure is able to reduce the amount time to generate a result from a user query on that large data set by using predicted queries based on analyzed historical usage patterns. The query prediction system 100 can predict user queries per user and provide the results before the user requests the search in some examples, such as by performing the search operations based on the predicted queries before a request is received to perform the queries. It should be noted that in some examples, the historical data used for the query predictions is based in part on the query history of other user (e.g., a user within a same company or searching the same databases). Thus, using the neural network 116, a large amount data can be "pre-searched" using predictive query analysis according to various examples.

In some examples, the query prediction system 100 is configured to use the predictive analysis to format a query, run the query, and then notify the user of the results of the query. As such, the user is able to quickly access search results to predictive queries without having to wait for the data to be processed. A user is thereby able to access search results immediately, instead of after lengthy processing that can last a day or more.

Figure 2:
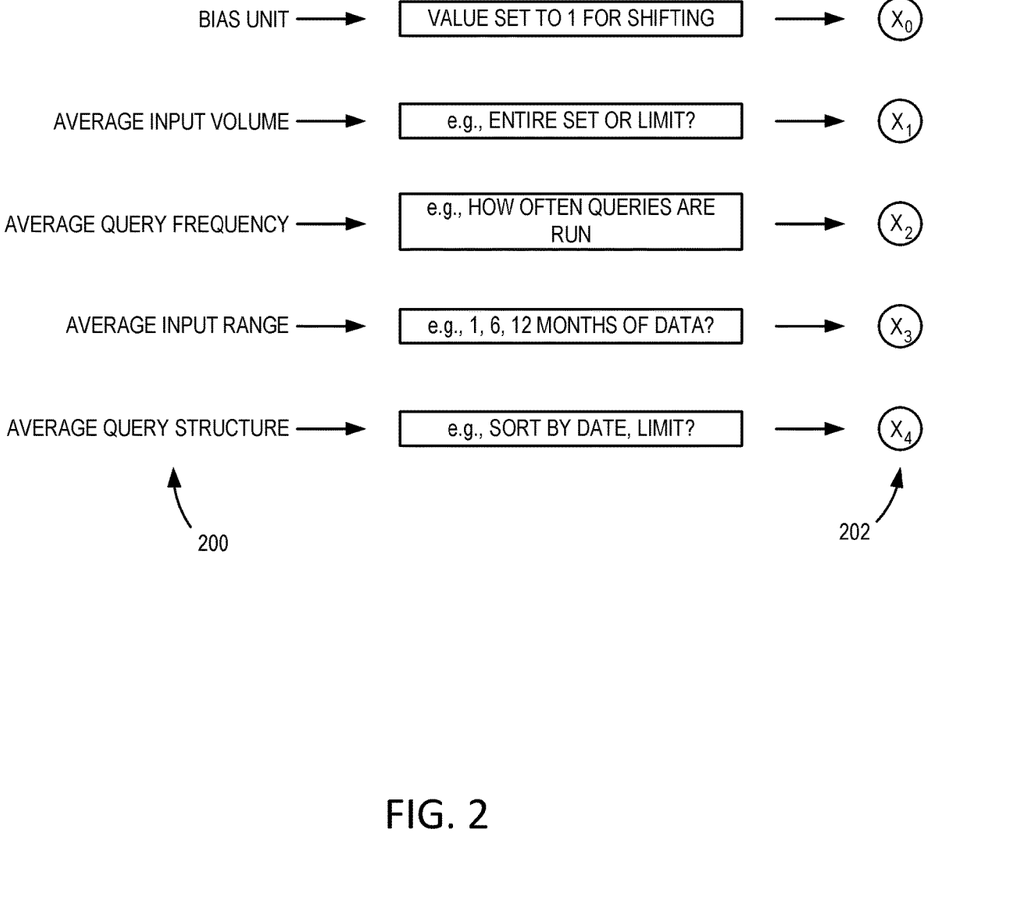
FIG. 2 illustrates query parameters as neural network inputs according to an embodiment.

The query prediction system 100 analyzes one or more different query parameters to predict one or more possible searches. For example, as illustrated in FIG. 2, one or more query parameters 200 related to previous searches for a user can be used as inputs to the neural network 116. The query parameters 200 in some examples are search criteria that define the data set to be searched. FIG. 2 illustrates five query parameters that are used as inputs 202 (illustrated as $x_0$-$x_4$) to the neural network 116. In the illustrated example, the query parameters 200 are not related to substantive search terms (e.g. keywords), but instead define the type and content of the data to be searched. For example, the query parameters 200 define search variables used to predict future searches by the user, such as a bias value (used as an offset when performing neural operations), an average input volume (e.g., how many files are typically used in the user's query), an average query frequency (e.g., queries run every week, month, etc.), and average input range (e.g., one or six months, or one, two or five years of transaction data), and average query structure (e.g., sort results by date or other limit).

Figure 3:
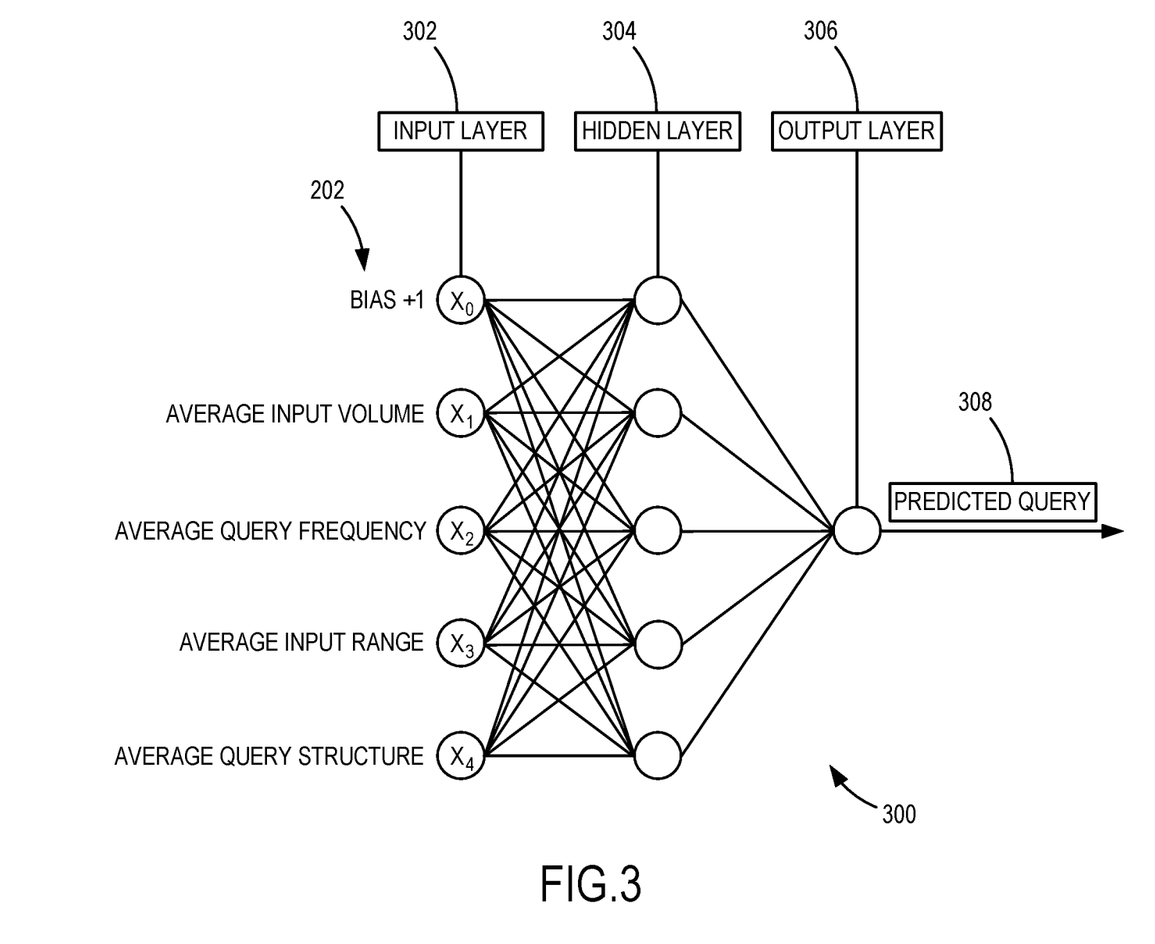
FIG. 3 illustrates a neural network according to an embodiment.

More particularly, and continuing with the example above, a three-layer neural network 300 as illustrated in FIG. 3 is implemented to predict queries in one example. The three-layer neural network 300 includes an input layer 302 that receives the inputs 202, a hidden layer 304 that performs neural operations using neural processing technology (e.g., using neural network algorithms), and an output layer 306 that provides an output used to generate the predicted query 308 based on the inputs 202. In operation, one or more query parameters (and optionally other parameters such as a bias value) that define input values are input to the three-layer neural network 300. In one example, from these inputs, the three-layer neural network 300 generates one or more corresponding output values that represent some combination of any number of the input values. The outputs are used to generate one or more predicted queries 308 in some examples. The format of the inputs to and outputs from the neural network 300 are configured in various examples to be complementary or compatible with the searching program or data to be searched.

Figure 4:
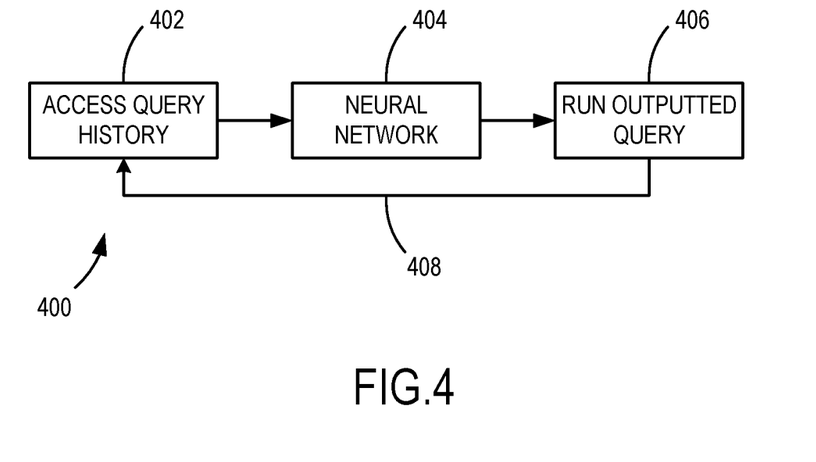
FIG. 4 is an exemplary block diagram illustrating a workflow according to an embodiment.

As shown in FIG. 4, illustrating a workflow 400 in accordance with various examples, a query history is accessed at 402. For example, a query history for a particular user that has been saved is accessed. The query history includes the query commands initiated by a user over a certain time period, which can be updated or reset. Using the accessed query history, query parameters can be extracted. For example, based on a set of user queries, individual or aggregate query parameters are identified (e.g., parameters related to one search criterion or a combination of search criteria). A neural input value for each of these parameters is then determined based on the accessed query history data in some examples. In other examples, the search criteria data itself is used as the neural network inputs.

The neural network inputs (e.g., determined values) are then input to a neural network 404 for processing. The neural network 404 performs neural network operations in the neural network processing technology (e.g., using one or more neural network operations) to generate a predicted query as described herein. In one example, the output of the neural network is defined as follows:

$$y = \sigma(xW+b) \quad \text{Eq. 1}$$

In the above equation, x is a vector, W is a weight, b is a bias term, σ represents non-linearity, and y is the output.

The neural network 404 in various examples is a collection of nodes interconnected by edges and where weights are associated with the nodes and/or edges. A non-linear function (σ) is applied in each node to produce the node's activation. The non-linear functions can include, but are not limited to sigmoid, tan h, and rectifier functions. The units used in the neural network 404 can comprise input units, hidden units and output units. Input units are units at which input is made to the neural network 404 (e.g., the query parameter values), the hidden units are connected between input units and output units (or other hidden units in the case of deep networks), and the output units are units output from the neural network 404.

Additionally, the neural network can have a layered configuration with a layer of input nodes, one or more layers of hidden nodes and at least one output layer as described herein. During use of the neural network (after training) as a signal passes through a layer, the signal produces an output via the activations that becomes the input to the next layer of the neural network and so on, until the signal reaches the output layer and the output units are activated. The pattern of activations at the output layer gives the prediction of the neural network, which in various examples is the predicted query 308. It should be noted that the pattern of activations is influenced by weights learned during a training phase or stage.

The workflow 400 then runs the outputted query at 406. In some examples, the query is run without user confirmation of the query (or set of queries) or specific parameters used for the neural network processing. A feedback loop 408 generates query specific data that can be used as part of the query history or to adjust the inputs to the neural network 404. For example, the feedback loop 408 in some examples is a feedback mechanism that analyzes the predicted query that the user actually selects (after the query has run in various examples) and identifies the elements and/or parameters in that selection (e.g., values for query parameters 200). The feedback loop 408 in some examples allows the neural network 404 to promote or rank similar queries in future predictions (e.g., based on which input volume, query frequency, input range, or query structure is selected more often by the user).

Some of the feedback can be used in the training phase or stage for the neural network 404 to adjust the weights that affect the output. For example, the neural network 404 is trained in one example using forward and back propagation processes and weight updating in the neural network training technology. In one example, the neural network training process includes performing the following calculations (using modified input values from the feedback loop 408):

$$y_0 = \sigma(x_0 W + b) \text{---forward pass} \quad \text{Eq. 2}$$

$$L = f(y_0^* - y_0) \text{---loss calculation, where } f \text{ is a loss function} \quad \text{Eq. 3}$$

$$\nabla W = dL/dW \text{---back propagation to calculate gradients} \quad \text{Eq. 4}$$

$$W_{\{t+1\}} = W_t + \eta \cdot \nabla W \text{---weight update} \quad \text{Eq. 5}$$

In the above equations, x is a vector, W is a weight, b is a bias term, σ represents non-linearity, $y_0$ is the input, $y_0^*$ is the expected output, and η is a learning rate. The difference of $y_0^*$ and $y_0$ (i.e., $y_0^* - y_0$) is back propagated to train the neural network to calculate the weight updates, which affect the predicted queries output by the neural network 404. It should be noted that the present disclosure can be implemented in connection with different types of networks having multiple layers as described herein.

Figure 5:
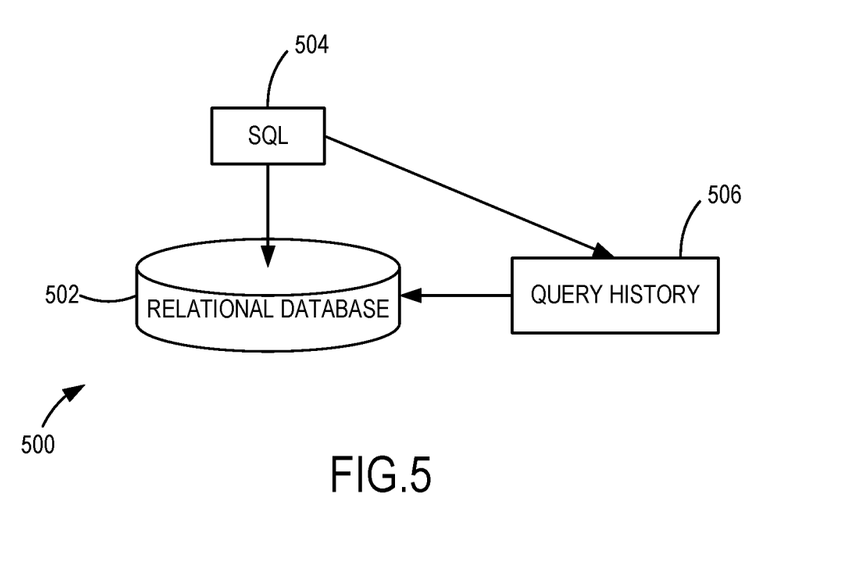
FIG. 5 is an exemplary block diagram illustrating an architecture according to an embodiment.

It should be appreciated that the different architectures and data structures can be used in accordance with the present disclosure. For example, FIG. 5 illustrates one architecture 500 that includes a relational database 502, such as a Hadoop® Distributed File System (HDFS) that operates in connection with Apache Hadoop® utilities to process data within the relational database 502. In various examples, the relational database 502 is configured as distributed storage.

In the illustrated example, a structured query language (SQL) 504 is used to generate the user queries and the queries are stored as a query history 506 for the user. Thus, SQL commands are used to search the relational database 502 in one example. It should be noted that different SQL frameworks can be used, such as Apache Hive and Apache Impala®. Moreover, while the architecture 500 is described in connection with an Apache Hadoop® operating environment, different operating environments and database structures are contemplated by the present disclosure.

In one example, the architecture 500 stores the query history 506 as a list of previous queries requested by the user, which queries are dissected into elements, such as query parameters that are extracted as neural network inputs. In some examples, the queries are not dissected and complete query commands are used as the neural network inputs. As described herein, the elements, namely the query parameters, are input to the neural network 404 (shown in FIG. 4), which are used to generate predicted queries.

Figure 6:
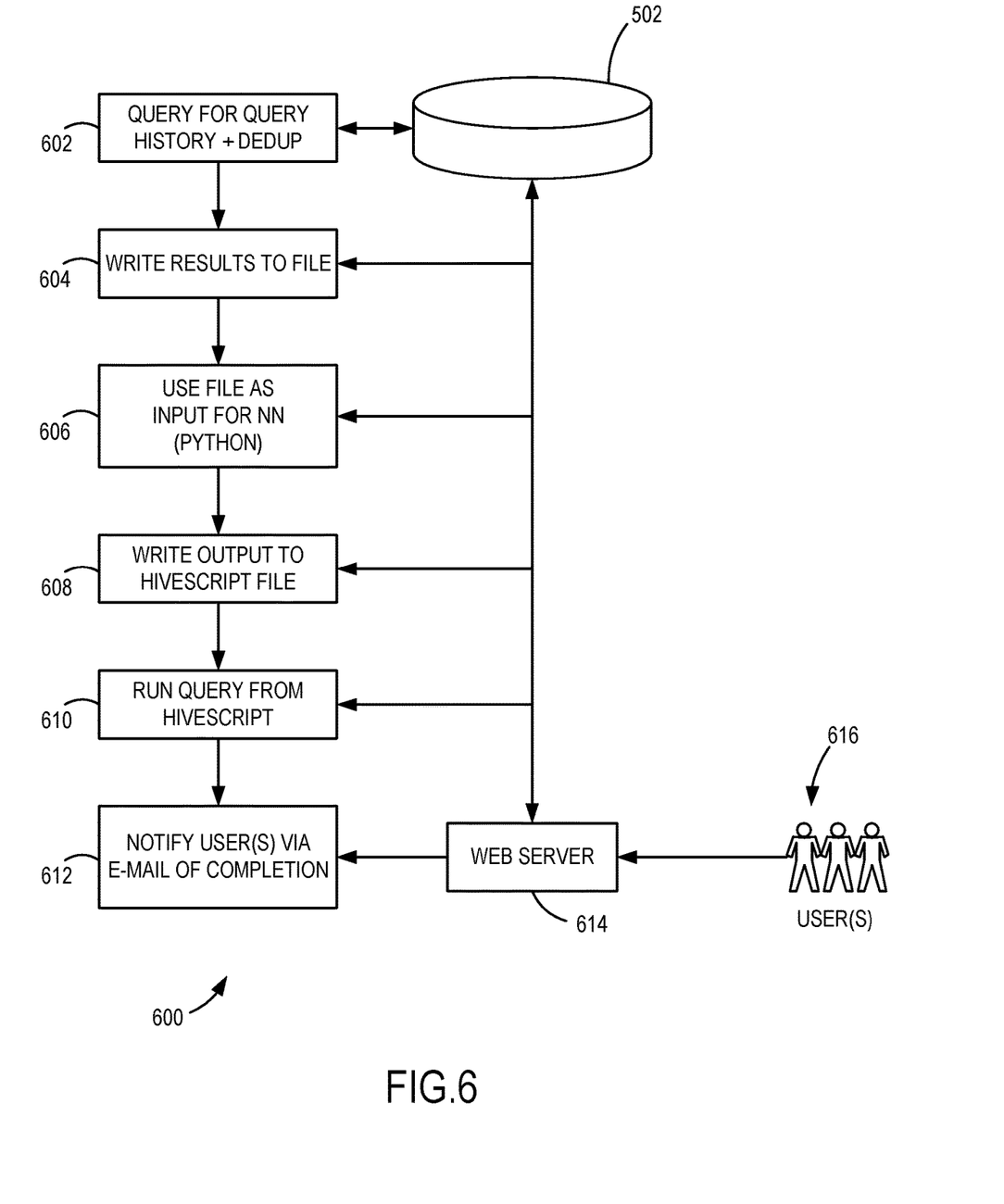
FIG. 6 illustrates a predicted query generation process according to an embodiment.

More particularly, FIG. 6 illustrates a predicted query generation process 600 in accordance with one example. The predicted query generation process 600 implements neural network logic to generate the predicted queries. In operation, queries for a user as stored in the query history 506 (shown in FIG. 5) are received at 602. For example, queries over a defined time period (or all the queries in the query history 506) are accessed (e.g., access the query commands) and written to a file at 604. For example, the query history comprises a list of per user queries that are stored for use as an input file to perform neural network analysis to generate the predicted one or more queries. That is, query parameters from the input file are used as an input to the neural network at 606. The query parameters in some examples define input values to the neural network.

The output of the neural network, that is the predicted query or values used to generate the predicted query, is then written to a script file at 608. In one example, operations 602 and 604 are performed using an Apache Impala® query and operations 606 and 608 are performed using a Spark program, both part of the Apache Hadoop® framework. For example, the output from the neural network in some examples is written to a HiveScript file at 608, as part of Apache Hive that provides data summarization, query and analysis.

The predicted query is then used to run a search at 610, which in the Hadoop® environment example can be performed using a Hive query. Thus, in some examples, the predicted query output from the neural network, which is configured as a script that runs multiple commands (e.g., a HiveScript that executes a set of Hive commands), is run to generate results prior to the user requesting the query. The user 616 is then notified of the completion of the query at 612, for example, via email that search results are available. In some examples, notification or one or more predicted queries to be run are first sent to the user for confirmation before executing the query, thereby providing suggested queries for the user. The notification is communicated to the user 616 via a web server 614 (e.g., a Hue server compatible with Hadoop® programs) in some examples. Thus, various examples predict a user's next query using neural network logic, which allows for pre-running the query and providing an automated output, or suggesting one or more possible queries to the user.

Figure 7:
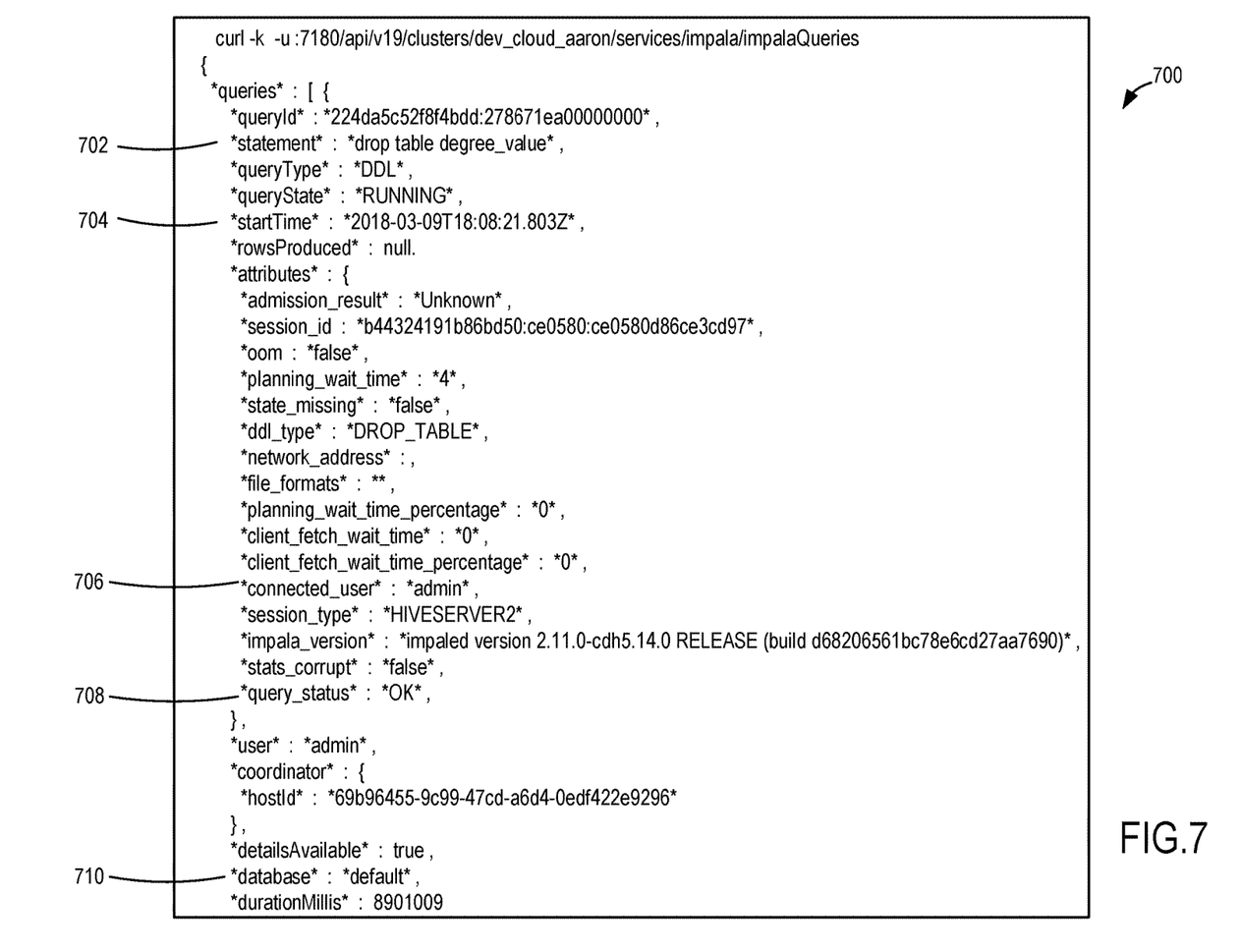
FIG. 7 illustrates a query history according to an embodiment.

FIG. 7 illustrates part of a query history 700 that can be acquired for example using an application programming interface (API), such as a representational state transfer (REST) API. In one example, the query history 700 is obtained by "pinging" a Hadoop® REST API. Using the query history, query parameters can be identified and/or extracted, such as the query 702 that was run, a timestamp 704 corresponding to the time the query was run, a user identification (ID) 706 corresponding to the user that ran the query, a completion status 708 indicating whether the query run was successful, and a dataset ID 710 corresponding to the dataset that was queried. It should be noted that other query parameters can be identified and/or extracted as described herein and the query history 700 is merely an example. In various examples, query history accumulated over time, such as aggregated over time, is accessed and used as inputs for neural network processing to generate predicted queries.

Figure 8:
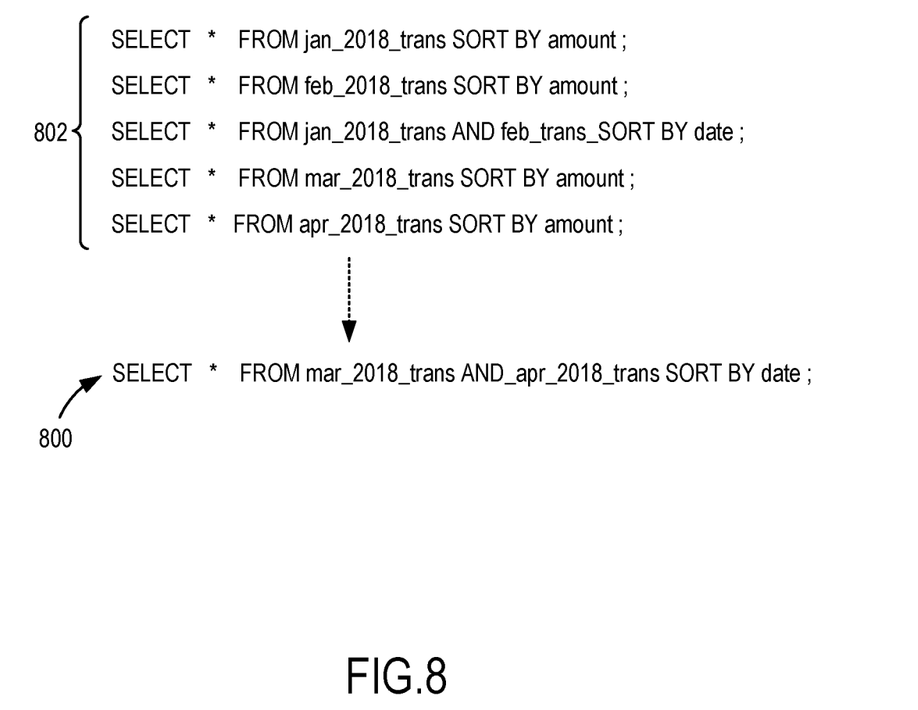
FIG. 8 illustrates queries according to an embodiment.

FIG. 8 illustrates a predicted query 800 generated from a query history 802. As should be appreciated, this is a simplified example merely for illustration. As can be seen, the user initially performs two individual month searches (transactions from January 2018 and then transactions from February 2018) and then a combined search (transactions from both January and February 2018) that is to be sorted by date. The user then performs two more individual month searches (transactions from March 2018 and then transactions from April 2018). Based on the query history 802, the present disclosure predicts a next query to be a combined search (transactions from both March and April 2018) to be sorted by date. In various examples, the predicted query 800 is run before the user requests the query, which can occur at the same time as the previous two individual month searches are running (transactions from March 2018 and then transactions from April 2018). That is, once a predicted query is determined, the query can be run while previous queries are still being run. Thus, if the user later requests the predicted query 800, which has already been run, the results will be immediately available.

In various examples, resource limits are set to prevent excessive computational burden. For example, predicted queries are not automatically run if a processing load is above a predetermined level. Additionally, the length of the query history can be adjusted, which may be based on a user input or predefined parameters. For example, the query history can include a list of a defined number of queries with the oldest query being deleted when the newest query is received (when the query number limit is reached).

In some examples, user feedback is used to improve the neural network model with the feedback mechanism. For example, user selections or certain predicted queries and not other predicted queries can be used to train or refine the processing by the neural network. It should be noted that users can opt out of the predictive query operation (e.g., if the user does not want his or her queries to be tracked, if a user does not want the extra processing load, etc.).

Figure 9:
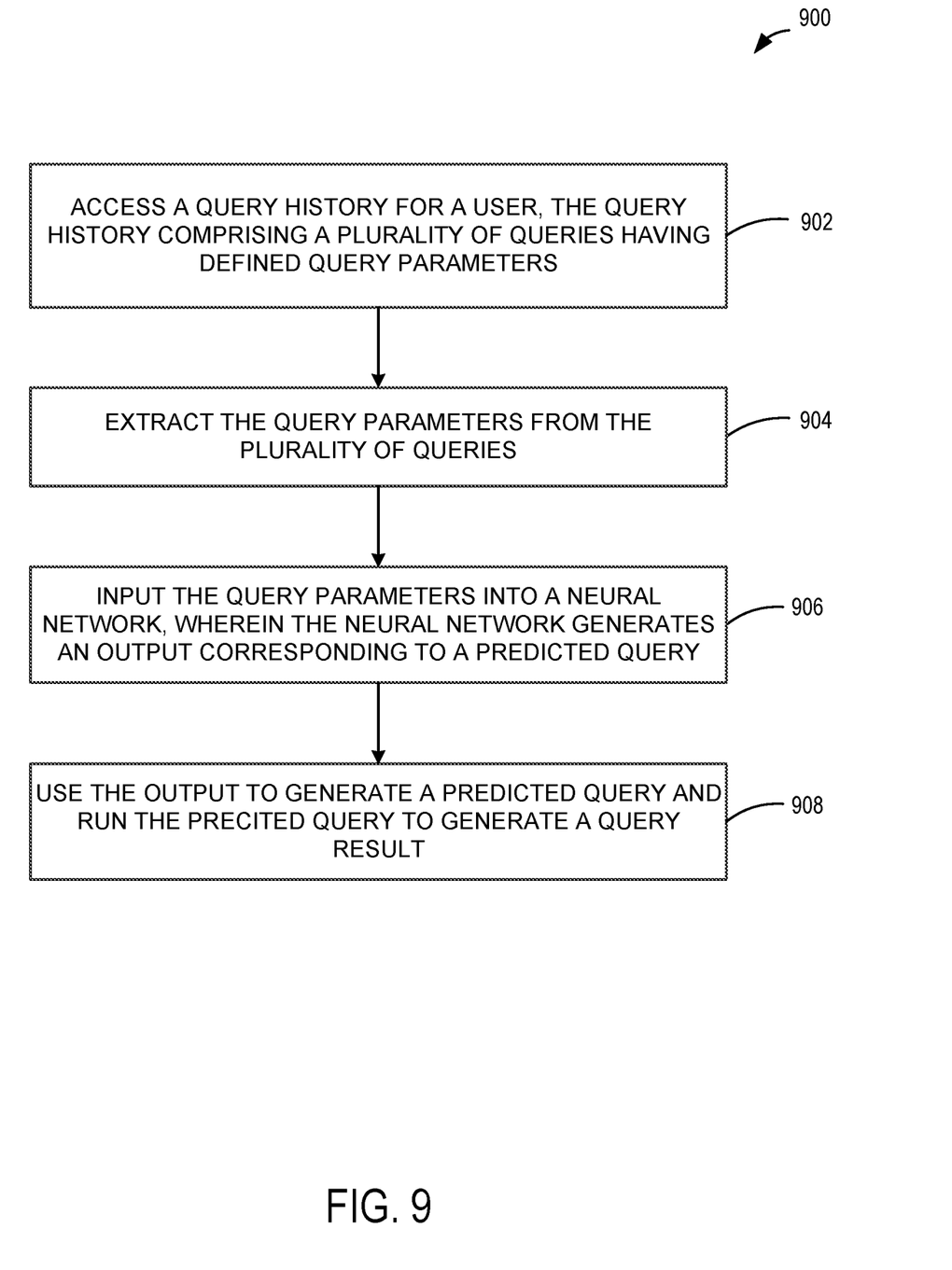
FIG. 9 is an exemplary flow chart illustrating operations of a computing device for generating predicted queries according to various embodiments.
Figure 10:
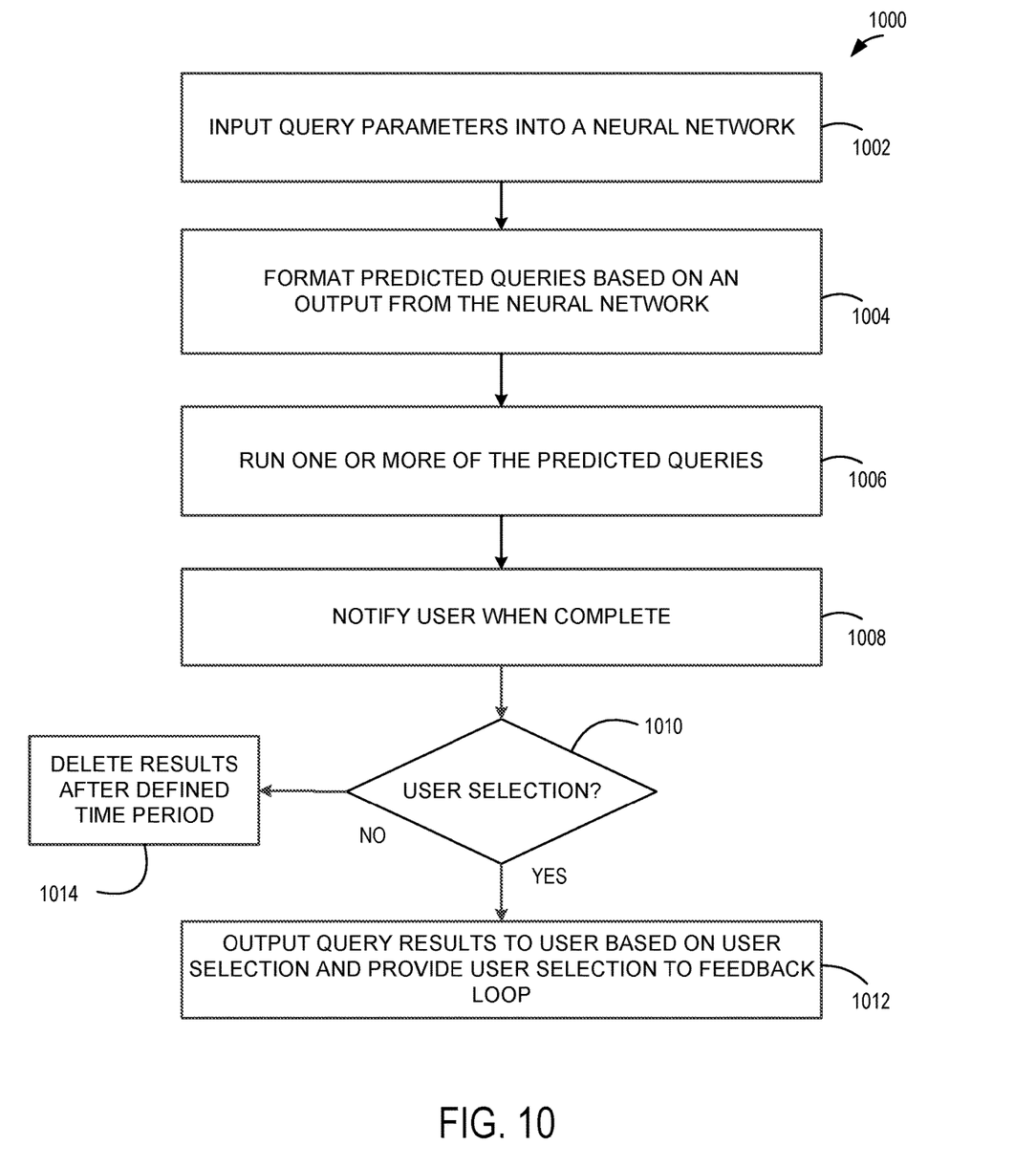
FIG. 10 is another exemplary flow chart illustrating operations of a computing device for generating predicted queries according to various embodiments.

FIGS. 9 and 10 illustrate exemplary flow charts of methods 900 and 1000 for generating predicted queries. In particular, these figures are exemplary flow charts illustrating operations of a computing device to generate predicted queries for use in searching data. The operations illustrated in the flow charts described herein may be performed in a different order than is shown, may include additional or fewer operations and may be modified as desired or needed. Additionally, one or more operations may be performed simultaneously, concurrently or sequentially.

With reference to the method 900 illustrated in FIG. 9, the computing device accesses a query history for a user at 902. The query history comprises a plurality of queries having defined query parameters. In some examples, the query parameters include one or more of an input volume, a query frequency, an input range, or a query structure as described herein. In one example, the query parameters are any non-keyword elements relating to a type of search that was performed. The type of search can be defined, for example, by at least one of a data size and a temporal search range relating to the date of the data (e.g., data stored in a relational database). In one example, the query history is accessed for only one user. As such, the predicted queries that are generated are per-user predicted queries. However, in other examples, queries from one or more other users can be accessed to generate the predicted quires.

The computing device extracts the query parameters from the plurality of queries at 904. For example, the query parameters from each of the user's search queries in the search history are identified, which may be based on a predefined list of query parameters (e.g., parameters related to specific desired or required search criteria). In some examples, all of the query parameters are extracted. The extracted query parameters can then be filtered, such as to remove parameters related to data content (e.g., keywords). However, in some examples, all of the query parameters are extracted and used.

The query parameters in some examples are formatted as a list within a file to be input to a neural network. In one example, the extracted search parameters are provided in a format expected by the neural network for processing. The query parameters are then input into a neural network for processing at 906. In one example, the neural network is trained using neural network training methods in the neural network technology to identify patterns in query parameters for the user. The neural network is trained in some examples using search data for only the particular user, but can also be trained using queries performed by other users on the same dataset.

In one example, a feedback mechanism is also provided as described herein to further refine the pattern analysis performed. The feedback mechanism can analyze the selected one of the predicted queries to identify the query parameters therein and adjust one or more inputs to the neural network based on the identified query parameters. For example, the feedback mechanism determines which query parameters the user selects most often (e.g., an input volume, a query frequency, an input range, or a query structure) include a value for those parameters (e.g., search over one-year time period), which combination of query parameters the user selects, etc.

The neural network generates an output corresponding to a predicted query based on the input file. In one example, the output is formatted as plain text corresponding to a defined query format that can be automatically run by a query operation. The computing device then uses the output from the neural network to generate a predicted query and run the predicted query to generate a query result. The query can be automatically run and the user notified upon completion of the query (e.g., notify the user by email that a query result for a predicted query are available). For example, a query processing engine can run the query on data within a relational database to generate an output, such as data matching the query parameters (e.g., records having a date within a defined date range). Thus, the computing device in some examples uses the output from the neural network to automatically generate the predicted query prior to the user requesting the predicted query and without user input. However, in some examples, the computing device uses the output to generate the predicted query after receiving confirmation from a user to run the predicted query, such as when the predicted query is first presented to the user as a suggested possible query to be run.

With reference now to the method 1000 illustrated in FIG. 10, the computing device inputs query parameters into a neural network at 1002. As described herein, extracted query parameters from a user's query history are used as inputs to the neural network that is trained to identify patterns in the query history. In some examples, the input to the neural network is based on a query structure for the user's queries. The input to the neural network can be an English language query that is not split into individual elements (e.g., divided or broken up into individual search elements). The neural network then generates an output that corresponds to one or more predicted queries.

The computing device then formats one or more predicted queries based on the output from the neural network at 1004. For example, the predicted queries are generated in a format to be used for a database or dataset query. In some examples, the predicted queries have a format similar to a format used by the user in previous queries.

The predicted queries are then run at 1006. For example, query operations on one or more datasets are run to generate query results. One or more subsets of data in the datasets are generated as the results in some examples. The user is then notified when the query operation is complete at 1008, such as when one or more of the results are available. The notification can be provided after one of the results is complete or after more than one of the results is complete. In some examples, instead of providing the notification when the search operation is complete, when a user inputs a query that is the same as a predicted query that is being run, the user is notified that the query operation is already being performed. As such, a new query is not started.

The computing device determines at 1010 whether the user has selected one or more of the search results based on the predicted query or queries that have been completed. If a user selects one or more of the query results, the results are output to the user (e.g., result dataset transmitted to user) at 1012. Additionally, the user selection is provided to a feedback loop for use in updating the neural network as described herein.

If no user selection is received at 1010, then after a defined time period, the results are deleted at 1014. For example, if the user has not selected any of the results or not responded to the notification after one day, one week, etc., the results are deleted to reduce the amount of storage used for the results of the predicted queries.

Thus, the present disclosure uses a neural network to predict user queries. The predicted queries allow for faster results to be provided to the user. For example, by pre-executing the queries, when the user selects one of the predicted queries, the results are already available.

As should be appreciated, the inputs to the neural network can be any values or input data related to query parameters. The neural network then outputs query features, such as predicted query parameters based on operations performed between the input values by the neural network, which are formatted into an executable search query. In some examples, the query parameters are not word search terms related to the substance of the data, but instead relate to the type of search being performed (e.g., date range, data volume, etc.).

Exemplary Operating Environment

Figure 11:
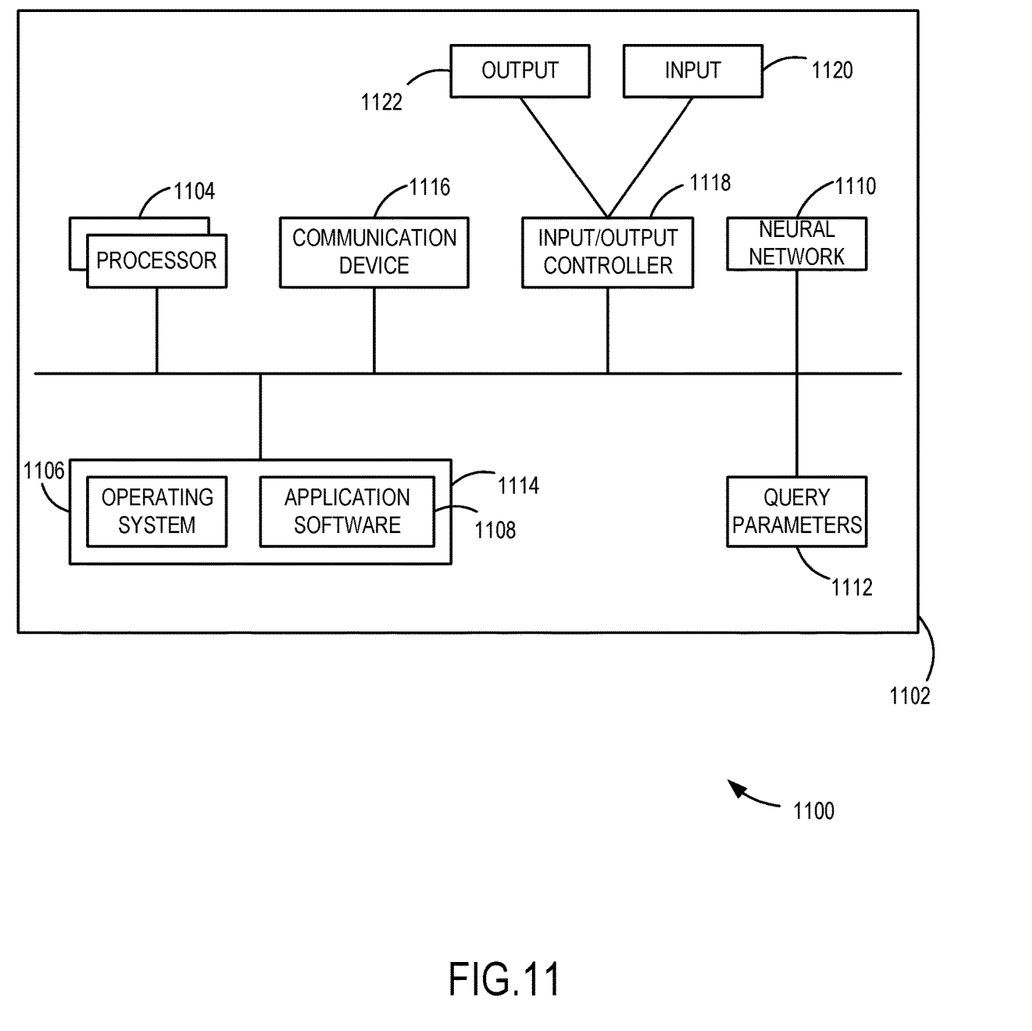
FIG. 11 illustrates a computing apparatus according to an embodiment as a functional block diagram.

The present disclosure is operable with a computing apparatus 1102 according to an embodiment as a functional block diagram 1100 in FIG. 11. In one example, components of the computing apparatus 1102 may be implemented as a part of an electronic device according to one or more embodiments described in this specification. The computing apparatus 1102 comprises one or more processors 1104 which may be microprocessors, controllers or any other suitable type of processors for processing computer executable instructions to control the operation of the electronic device. Platform software comprising an operating system 1106 or any other suitable platform software may be provided on the apparatus 1102 to enable application software 1108 to be executed on the device. According to an embodiment, generation of predicted queries using a neural network 1110 based on query parameters 1112, such as from a query history for a user, can be accomplished by software.

Computer executable instructions may be provided using any computer-readable media that are accessible by the computing apparatus 1102. Computer-readable media may include, for example, computer storage media such as a memory 1114 and communications media. Computer storage media, such as the memory 1114, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 1114) is shown within the computing apparatus 1102, it will be appreciated by a person skilled in the art, that the storage may be distributed or located remotely and accessed via a network or other communication link (e.g. using a communication interface 1116).

The computing apparatus 1102 may comprise an input/output controller 1118 configured to output information to one or more input devices 1120 and output devices 1122, for example a display or a speaker, which may be separate from or integral to the electronic device. The input/output controller 1118 may also be configured to receive and process an input from the one or more input devices 1120, for example, a keyboard, a microphone or a touchpad. In one embodiment, the output device 1122 may also act as the input device 1120. An example of such a device may be a touch sensitive display. The input/output controller 1118 may also output data to devices other than the output device 1122, e.g. a locally connected printing device. In some embodiments, a user may provide input to the input device(s) 1120 and/or receive output from the output device(s) 1122.

In some examples, the computing apparatus 1102 detects voice input, user gestures or other user actions and provides a natural user interface (NUI). This user input may be used to author electronic ink, view content, select ink controls, play videos with electronic ink overlays and for other purposes. The input/output controller 1118 outputs data to devices other than a display device in some examples, e.g. a locally connected printing device.

The functionality described herein can be performed, at least in part, by one or more hardware logic components. According to an embodiment, the computing apparatus 1102 is configured by the program code when executed by the processor(s) 1104 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Other examples include:

A system for generating queries, the system comprising:
at least one processor; and
at least one memory comprising computer program code, the at least one memory and the computer program code configured to, with the at least one processor, cause the at least one processor to:
access a query history for a user, the query history comprising a plurality of queries having defined query parameters;
extract the query parameters from the plurality of queries;
input the query parameters into a neural network, wherein the neural network generates an output corresponding to a predicted query; and
use the output to generate a predicted query and run the precited query to generate a query result.

A computerized method for generating queries, the computerized method comprising:
accessing a query history for a user, the query history comprising a plurality of queries having defined query parameters;
extracting the query parameters from the plurality of queries;
inputting the query parameters into a neural network, wherein the neural network generates an output corresponding to a predicted query; and
using the output to generate a predicted query and run the predicted query to generate a query result.

One or more computer storage media having computer-executable instructions for generating queries that, upon execution by a processor, cause the processor to at least:
access a query history for a user, the query history comprising a plurality of queries having defined query parameters;
extract the query parameters from the plurality of queries;
input the query parameters into a neural network, wherein the neural network generates an output corresponding to a predicted query; and
use the output to generate a predicted query and run the predicted query to generate a query result.

Alternatively, or in addition to the examples described above, examples include any combination of the following:
use the output to automatically generate the predicted query prior to a user requesting the predicted query and without user input.
use the output to generate the predicted query after receiving confirmation from a user to run the predicted query.
notify a user of the query result.
generate outputs corresponding to a plurality of predicted queries, receive a user selection of one of the predicted queries, use a feedback mechanism that analyzes the selected one of the predicted queries to identify the query parameters therein, and adjust one or more inputs to the neural network based on the identified query parameters.
analyze the plurality of selected predicted queries using the feedback mechanism to identify one or more other query parameters to rank the query parameters, and use the rank of the query parameters to adjust the one or more inputs to the neural network, wherein the query parameters comprise one or more of an input volume, a query frequency, an input range, or a query structure.
wherein the query parameters comprise non-keyword elements relating to a type of search performed, the type of search defined by at least one of a data size and a temporal search range relating to the date of the data.
access the query history for only one user.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for generating predicted queries using a neural network. The illustrated one or more processors 1104 together with the computer program code stored in memory 1114 constitute exemplary processing means for using and/or training neural networks to predict and run queries.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for generating queries, the system comprising:
   at least one processor; and
   at least one memory comprising computer program code, the at least one memory and the computer program code configured to, with the at least one processor, cause the at least one processor to:
   access a query history for a user, the query history comprising a plurality of queries having defined query parameters;
   extract the query parameters from the plurality of queries;
   input the query parameters into a neural network, wherein the neural network generates an output corresponding to a predicted query that is a most likely next query to be run by the user; and
   use the output to pre-run the predicted query, prior to the user requesting the predicted query and without user input, to generate a query result.

2. The system of claim 1, wherein the predicted query is pre-run automatically prior to the user request and generates pre-search results available to the user in response to the user requesting a search corresponding to the predicted query, the pre-search results being immediately available in response to the user requesting the search corresponding to the predicted query, the pre-running performed in response to new data files, upon which the user performed searches, being detected and saved.

3. The system of claim 1, wherein the at least one memory and the computer program code are further configured to, with the at least one processor, cause the at least one processor to notify the user of the query result and use the output to generate the predicted query after receiving confirmation from the user to run the predicted query.

4. The system of claim 1, wherein the neural network generates an output corresponding to a plurality of possible future queries to be run by the user.

5. The system of claim 1, wherein the neural network is a multi-layer neural network and the at least one memory and the computer program code are further configured to, with the at least one processor, cause the at least one processor to generate outputs corresponding to a plurality of predicted queries, receive a selection by the user of one of the predicted queries, use a feedback mechanism that analyzes the selected one of the predicted queries to identify the query parameters therein, and adjust one or more inputs to the multi-layer neural network based on the identified query parameters.

6. The system of claim 5, wherein the at least one memory and the computer program code are further configured to, with the at least one processor, cause the at least one processor to analyze the plurality of selected predicted queries using the feedback mechanism to identify one or more other query parameters to rank the query parameters, and use the rank of the query parameters to adjust the one or more inputs to the multi-layer neural network, wherein the query parameters comprise one or more of an input volume, a query frequency, an input range, or a query structure.

7. The system of claim 1, wherein the query parameters comprise non-keyword elements relating to a type of search performed, the type of search defined by at least one of a data size and a temporal search range relating to a date.

8. The system of claim 1, wherein the at least one memory and the computer program code are further configured to, with the at least one processor, cause the at least one processor to access the query history for only one user.

9. A computerized method for generating queries, the computerized method comprising:
   accessing a query history for a user, the query history comprising a plurality of queries having defined query parameters;
   extracting the query parameters from the plurality of queries;

inputting the query parameters into a neural network, wherein the neural network generates an output corresponding to a predicted query that is a most likely next query to be run by the user; and using the output to pre-run the predicted query, prior to the user requesting the predicted query and without user input, to generate a query result.

10. The computerized method of claim 9, further comprising using the output to automatically generate the predicted query prior to the user requesting the predicted query and without user input.

11. The computerized method of claim 9, further comprising using the output to generate the predicted query after receiving confirmation from the user to run the predicted query.

12. The computerized method of claim 9, further comprising notifying the user of the query result.

13. The computerized method of claim 9, further comprising generating outputs corresponding to a plurality of predicted queries, receiving a selection by the user of one of the predicted queries, using a feedback mechanism that analyzes the selected one of the predicted queries to identify the query parameters therein, and adjusting one or more inputs to the neural network based on the identified query parameters.

14. The computerized method of claim 13, further comprising analyzing the plurality of selected predicted queries using the feedback mechanism to identify one or more other query parameters to rank the query parameters, and using the rank of the query parameters to adjust the one or more inputs to the neural network, wherein the query parameters comprise one or more of an input volume, a query frequency, an input range, or a query structure.

15. The computerized method of claim 9, wherein the query parameters comprise non-keyword elements relating to a type of search performed, the type of search defined by at least one of a data size and a temporal search range relating to a date.

16. The computerized method of claim 9, further comprising accessing the query history for only one user.

17. One or more computer storage media having computer-executable instructions for generating queries that, upon execution by a processor, cause the processor to at least:

access a query history for a user, the query history comprising a plurality of queries having defined query parameters;

extract the query parameters from the plurality of queries;

input the query parameters into a neural network, wherein the neural network generates an output corresponding to a predicted query that is a most likely next query to be run by the user; and use the output to pre-run the predicted query, prior to the user requesting the predicted query and without user input, to generate a query result.

18. The one or more computer storage media of claim 17, having further computer-executable instructions that, upon execution by the processor, cause the processor to at least use the output to automatically generate the predicted query prior to the user requesting the predicted query and without user input.

19. The one or more computer storage media of claim 17, having further computer-executable instructions that, upon execution by the processor, cause the processor to at least use the output to generate the predicted query after receiving confirmation from the user to run the predicted query.

20. The one or more computer storage media of claim 17, having further computer-executable instructions that, upon execution by the processor, cause the processor to at least generate outputs corresponding to a plurality of predicted queries, receive a selection by the user of one of the predicted queries, use a feedback mechanism that analyzes the selected one of the predicted queries to identify the query parameters therein, and adjust one or more inputs to the neural network based on a ranking of the identified query parameters determined from user selections.

* * * * *